United States Patent
Moler et al.

(10) Patent No.: US 8,850,892 B2
(45) Date of Patent: *Oct. 7, 2014

(54) SMART MATERIAL ACTUATOR WITH ENCLOSED COMPENSATOR

(75) Inventors: Jeffery Moler, Sarasota, FL (US); Aaron Dickey, Sarasota, FL (US)

(73) Assignee: Viking AT, LLC, Sarasota, FL (US)

( * ) Notice: Subject to any disclaimer, the term of this patent is extended or adjusted under 35 U.S.C. 154(b) by 91 days.

This patent is subject to a terminal disclaimer.

(21) Appl. No.: 13/577,819

(22) PCT Filed: Feb. 17, 2011

(86) PCT No.: PCT/US2011/025299
§ 371 (c)(1), (2), (4) Date: Aug. 8, 2012

(87) PCT Pub. No.: WO2011/103328
PCT Pub. Date: Aug. 25, 2011

(65) Prior Publication Data
US 2012/0297880 A1    Nov. 29, 2012

Related U.S. Application Data

(60) Provisional application No. 61/305,345, filed on Feb. 17, 2010.

(51) Int. Cl.
*F03G 7/00* (2006.01)
*G01P 15/09* (2006.01)
*H02N 2/18* (2006.01)
*H04R 17/00* (2006.01)
*H02N 2/04* (2006.01)

(52) U.S. Cl.
CPC ............. *H04R 17/00* (2013.01); *H02N 2/043* (2013.01); *H02N 2/186* (2013.01)

USPC ...................................... 73/514.34

(58) Field of Classification Search
CPC ..... G01P 15/09; G01P 15/18; G01P 15/0922; G01P 15/0802; G01P 15/123
USPC ...................................... 73/514.34
See application file for complete search history.

(56) References Cited

U.S. PATENT DOCUMENTS

| 1,922,196 A | 8/1933 | Butler |
| 4,435,666 A | 3/1984 | Fukui et al. |

(Continued)

FOREIGN PATENT DOCUMENTS

| JP | 2003251261 | 11/1991 |
| JP | 2004130681 | 5/1992 |

(Continued)

*Primary Examiner* — Hezron E Williams
*Assistant Examiner* — Gregory J Redmann
(74) *Attorney, Agent, or Firm* — William G. Giltinan; Carlton Fields Jorden Burt, PA

(57) ABSTRACT

An actuator driven by a smart material device and suitable for use as an actuator, energy capture device, or sensor, having an enclosed compensator, potting material, at least one actuating arm, and two mechanical webs and a movable supporting member adapted such that application of a suitable electric potential causes a change in shape of the smart material device, thereby flexing the mechanical webs and causing movement of the actuating arm. As an energy capture device or sensor, external motion causes the actuating arm to move, thereby causing the smart material device to generate recoverable electrical energy or an electric signal indicating motion.

20 Claims, 12 Drawing Sheets

(56) References Cited

U.S. PATENT DOCUMENTS

| | | |
|---|---|---|
| 4,442,372 A | 4/1984 | Roberts |
| 4,518,887 A | 5/1985 | Yano et al. |
| 4,547,086 A | 10/1985 | Matsumoto et al. |
| 4,570,095 A | 2/1986 | Uchikawa |
| 4,633,120 A | 12/1986 | Sato et al. |
| 4,783,610 A | 11/1988 | Asano |
| 4,977,916 A | 12/1990 | Ohmi et al. |
| 5,096,388 A | 3/1992 | Weinberg |
| 5,751,091 A | 5/1998 | Takahashi et al. |
| 5,828,157 A | 10/1998 | Miki et al. |
| 6,213,739 B1 | 4/2001 | Phallen et al. |
| 6,359,370 B1 | 3/2002 | Chang |
| 6,435,840 B1 | 8/2002 | Sharma et al. |
| 6,513,213 B1 | 2/2003 | Muramatsu et al. |
| 6,520,479 B1 | 2/2003 | Sato |
| 6,548,938 B2 | 4/2003 | Moler et al. |
| 6,717,332 B2 | 4/2004 | Moler et al. |
| 6,737,788 B2 | 5/2004 | Moler et al. |
| 6,759,790 B1 | 7/2004 | Bugel et al. |
| 6,784,599 B1 | 8/2004 | Stoecklein et al. |
| 6,789,087 B1 | 9/2004 | Sako |
| 6,834,419 B2 | 12/2004 | Lopatin et al. |
| 6,836,056 B2 | 12/2004 | Oudshoorn et al. |
| 6,870,305 B2 | 3/2005 | Moler |
| 6,924,586 B2 | 8/2005 | Moler |
| 6,975,061 B2 | 12/2005 | Moler |
| 6,979,933 B2 | 12/2005 | Oudshoorn et al. |
| 7,036,769 B2 | 5/2006 | Wood |
| 7,040,349 B2 | 5/2006 | Moler et al. |
| 7,064,472 B2 | 6/2006 | Pelrine et al. |
| 7,104,768 B2 | 9/2006 | Richter et al. |
| 7,126,259 B2 | 10/2006 | Moler et al. |
| 7,132,781 B2 | 11/2006 | Moler et al. |
| 7,163,385 B2 | 1/2007 | Gharib et al. |
| 7,190,102 B2 | 3/2007 | VanderSluis |
| 7,217,103 B2 | 5/2007 | Herwig et al. |
| 7,258,533 B2 | 8/2007 | Tanner et al. |
| 7,261,352 B2 | 8/2007 | Maslov et al. |
| 7,368,856 B2 | 5/2008 | Moler et al. |
| 7,429,815 B2 | 9/2008 | Gibson et al. |
| 7,453,187 B2 | 11/2008 | Richards et al. |
| 7,462,976 B2 | 12/2008 | Semmere et al. |
| 7,524,298 B2 | 4/2009 | Gharib et al. |
| 7,560,856 B2 | 7/2009 | Chen et al. |
| 7,564,171 B2 | 7/2009 | Moler et al. |
| 7,667,375 B2 | 2/2010 | Berkcan et al. |
| 7,687,977 B2 | 3/2010 | Xu |
| 7,939,992 B2 | 5/2011 | Ehrlich |
| 2002/0109436 A1 | 8/2002 | Peng et al. |
| 2003/0127948 A1 | 7/2003 | Moler et al. |
| 2004/0035106 A1 | 2/2004 | Moler et al. |
| 2004/0263025 A1 | 12/2004 | Moler et al. |
| 2005/0116583 A1 | 6/2005 | Nishio et al. |
| 2005/0146248 A1 | 7/2005 | Moler et al. |
| 2005/0146698 A1 | 7/2005 | Hols et al. |
| 2005/0231077 A1 * | 10/2005 | Moler et al. ................. 310/328 |
| 2006/0017349 A1 | 1/2006 | Moler et al. |
| 2006/0159568 A1 | 7/2006 | Lutz |
| 2007/0025868 A1 | 2/2007 | Swayze et al. |
| 2007/0247024 A1 | 10/2007 | Semmere et al. |
| 2008/0038128 A1 | 2/2008 | Haar |
| 2008/0061031 A1 | 3/2008 | Hashiguchi et al. |
| 2008/0193307 A1 | 8/2008 | Elata et al. |
| 2008/0265712 A1 | 10/2008 | Ulm et al. |
| 2008/0315719 A1 | 12/2008 | Gibson et al. |
| 2008/0315722 A1 | 12/2008 | Clingman et al. |
| 2009/0152990 A1 | 6/2009 | Brown et al. |
| 2010/0111733 A1 | 5/2010 | Ramunas et al. |
| 2010/0207411 A1 | 8/2010 | Sun et al. |
| 2011/0309721 A1 | 12/2011 | Moler |
| 2012/0001518 A1 | 1/2012 | Moler |
| 2012/0038245 A1 | 2/2012 | Moler et al. |
| 2013/0234561 A1 | 9/2013 | Moler |

FOREIGN PATENT DOCUMENTS

| | | |
|---|---|---|
| JP | 04164581 | 6/1992 |
| JP | 07129244 | 5/1995 |
| JP | 07301354 | 11/1995 |
| JP | 09018064 | 1/1997 |
| JP | 09100930 | 4/1997 |
| JP | 2009183241 | 7/1997 |
| JP | 11146663 | 5/1999 |
| JP | 2002322129 | 11/2000 |
| JP | 2002058260 | 2/2002 |
| JP | 2002118303 | 4/2002 |
| JP | 2002263979 | 9/2002 |
| JP | 2003199366 | 7/2003 |
| JP | 2004048955 | 2/2004 |
| JP | 2004197754 | 7/2004 |
| JP | 2005149679 | 6/2005 |
| JP | 2006138913 | 6/2005 |
| JP | 2005302711 | 10/2005 |
| JP | 2007006616 | 1/2007 |
| JP | 2008029111 | 2/2008 |
| JP | 2008099399 | 4/2008 |
| JP | 2009048506 | 3/2009 |
| WO | WO2009093907 | 7/2009 |
| WO | 2011006028 | 1/2011 |
| WO | 2011006164 | 1/2011 |
| WO | 2011029081 | 3/2011 |
| WO | 201103324 | 8/2011 |
| WO | 2011103328 | 8/2011 |
| WO | 2012079012 | 9/2012 |
| WO | 2012118584 | 9/2012 |

* cited by examiner

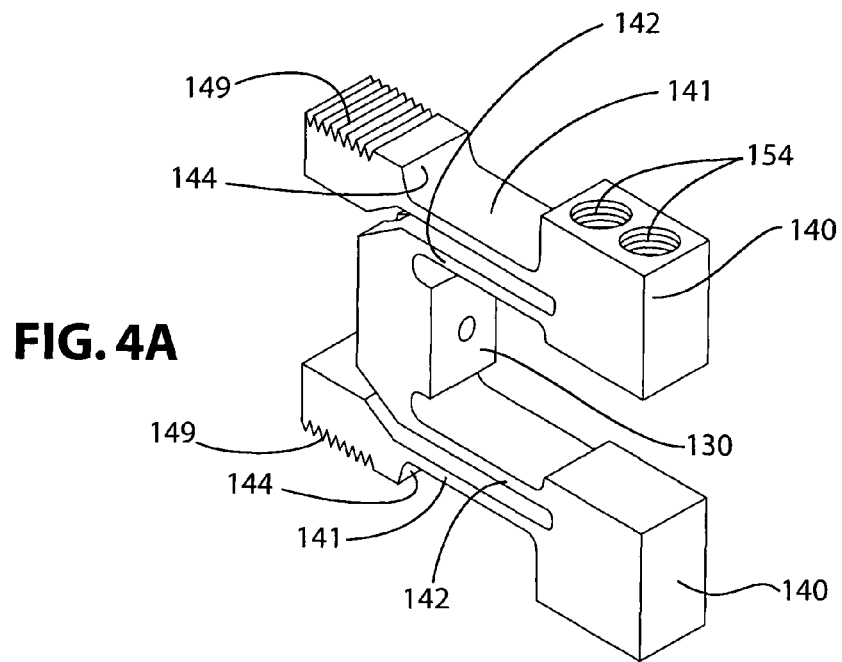
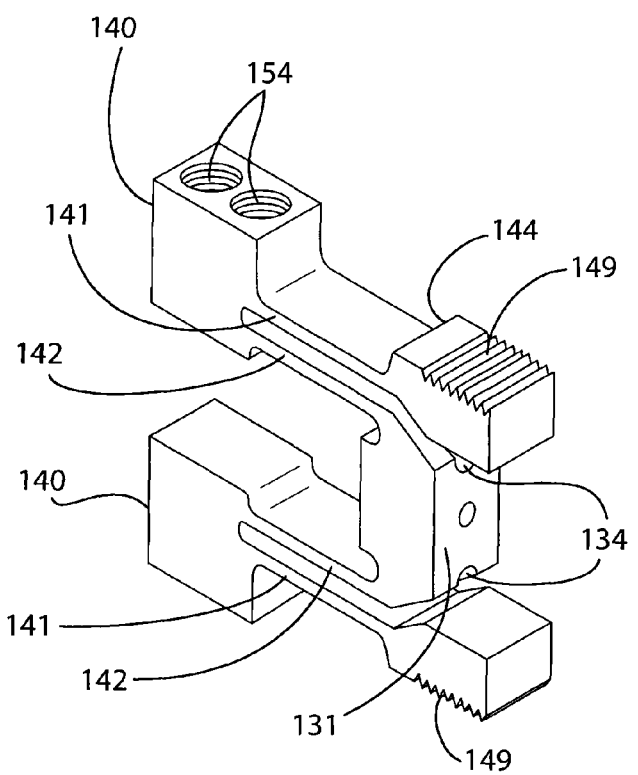

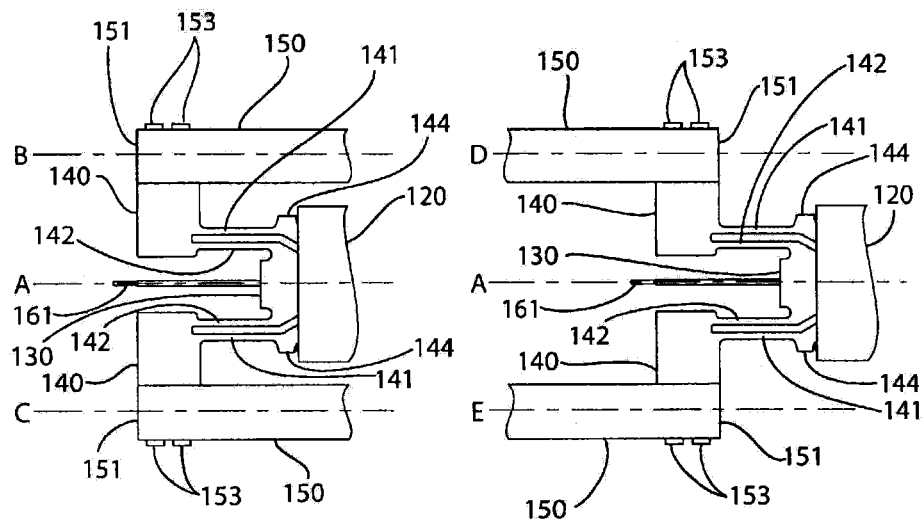
FIG. 18     FIG. 19
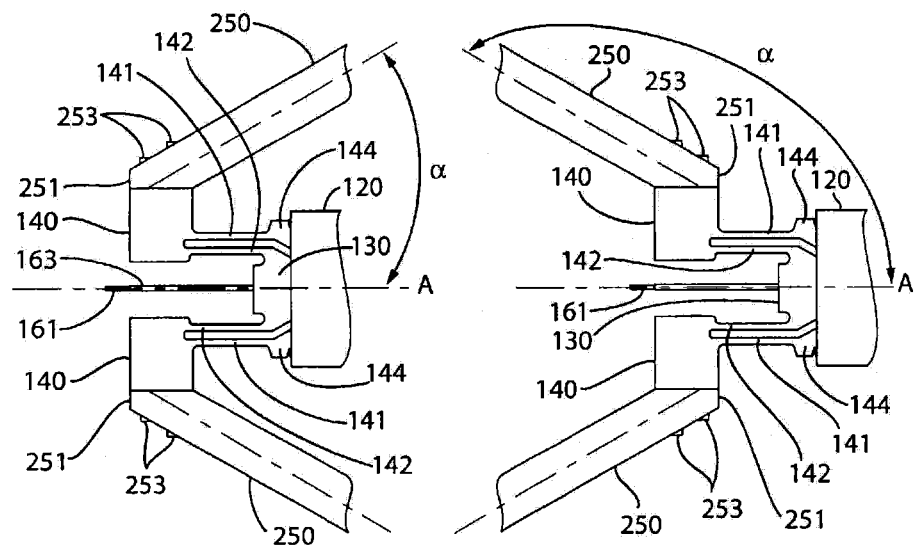
FIG. 20     FIG. 21

SMART MATERIAL ACTUATOR WITH ENCLOSED COMPENSATOR

This application claims priority to provisional application 61/305,345 which is incorporated herein by reference.

BACKGROUND

The present invention relates to an actuator having up to two actuating arms and an enclosed compensator, and which is driven by a piezo or other smart material device. Actuators according to the present invention may be adapted for use as an actuator, an energy capture device, or a sensor.

Smart material actuators are known in the art. However, such actuators typically have an open compensator surrounding the piezo or other smart material device. Open compensators have been thought to be preferred because of ease of assembly. A significant limitation of such configurations, however, is that the piezo or other smart material device remains exposed. The present invention overcomes such limitations by providing an actuator with up to two arms in which the piezo or smart material device remains protected, and which remains convenient to assemble.

A further objective of the present invention is to provide an actuator apparatus capable of operation at high frequencies. Known smart material actuators tend to fail when operated at very high frequencies of repeated activation and deactivation. One reason for such failures is that the actuating arms tend to overextend during high speed operation and especially when operating at resonant frequencies. Certain embodiments of the actuator of the present invention, however, are designed to overcome such limitations both by reducing the weight of the actuating arms and by providing dampeners adapted to prevent such overextensions without hindering high speed operation. The result is an actuator capable of operation at very high frequencies.

A still further objective of the present invention is to provide a smart material actuator capable of being operated with actuating arms at a variety of angles. Allowing use of actuating arms of varying angles allows for greater flexibility as arm angles can be selected to meet physical constraints imposed by differing applications. At the same time, it is disclosed that certain ranges of arm angles result in more efficient operation than others in terms of actuator work output. Accordingly, by providing an actuator apparatus capable of use with multiple arm angles, it becomes possible to optimize efficiency by adjusting arm angles.

In addition, the present invention is adapted such that common components can be utilized to assemble actuators of several configurations. This allows for flexibility and efficiency in manufacturing, as common components may be manufactured in bulk and then assembled in wide range of configurations adapted to different applications.

SUMMARY

The present invention provides an actuator apparatus comprising a smart material device, an enclosed compensator, potting material, a movable supporting member, two mechanical webs, and at least one actuating arm. The mechanical webs have a first compliant member attached to a compensator mounting surface that is adapted to receive the compensator by way of an attachment means. The mechanical webs further comprise a second compliant member attached to the movable supporting member. The compensator has a first mounting surface integral to or in connection with its interior surface, and the smart material device is affixed within the compensator, at least partially surrounded by the potting material, and between the first mounting surface and a second mounting surface integral to or in connection with the movable supporting member. The second mounting surface is opposed and substantially parallel to the first mounting surface to reduce or eliminate angular deflection of the smart material device during operation.

Up to two actuating arms comprise a first actuating arm end attached to one mechanical web and an opposed second actuating arm end. Application of an electrical potential causes the smart material device to expand substantially without angular movement. This expansion urges the movable supporting member away from the first mounting surface and causes the compliant members to flex, thereby moving the actuating arm. The movement is such that the motion of said second actuating arm end is across a distance greater than the expansion of said smart material device. In this way, the mechanical webs and actuating arms serve as a mechanical amplifier for the expansion of the smart material device.

Embodiments of the present invention may be adapted to operate as an energy capture device in which movement of the actuating arms compresses and releases the smart material device, thereby generating electrical current. Other embodiments may be adapted to be used as a sensor in which the signal generated by the arm movement senses the motion of the arms.

BRIEF DESCRIPTION OF THE DRAWINGS

Other objectives and features of the present invention will become apparent from the attached drawings, which illustrate certain preferred embodiments of the apparatus of this invention, wherein

FIG. 4A is a perspective view of the mechanical webs, compensator attachment surface, and movable supporting member of the embodiments illustrated in FIGS. 1-3;

FIG. 4B is a second perspective view of the mechanical webs, compensator attachment surface, and movable supporting member of the embodiments illustrated in FIGS. 1-3, illustrating the second mounting surface;

FIG. 18 is a side, detail view of an embodiment of the actuator of the present invention having two removably attachable actuating arms configured at a zero degree angle with respect to the smart material device within the compensator;

FIG. 19 is a side, detail view of an embodiment of the actuator of the present invention having two removably attachable actuating arms as shown in FIG. 18, but configured at a one hundred eighty degree angle with respect to the smart material device within the compensator;

FIG. 20 is a perspective view of an embodiment of the actuator of the present invention having two removably attachable actuating arms configured at approximately a forty-five degree angle with respect to the smart material device within the compensator;

FIG. 21 is a side, detail view of an embodiment of the actuator of the present invention having two removably attachable actuating arms as shown in FIG. 20, but configured at a one hundred thirty-five degree angle with respect to the smart material device within the compensator;

DETAILED DESCRIPTION

Figure 1:
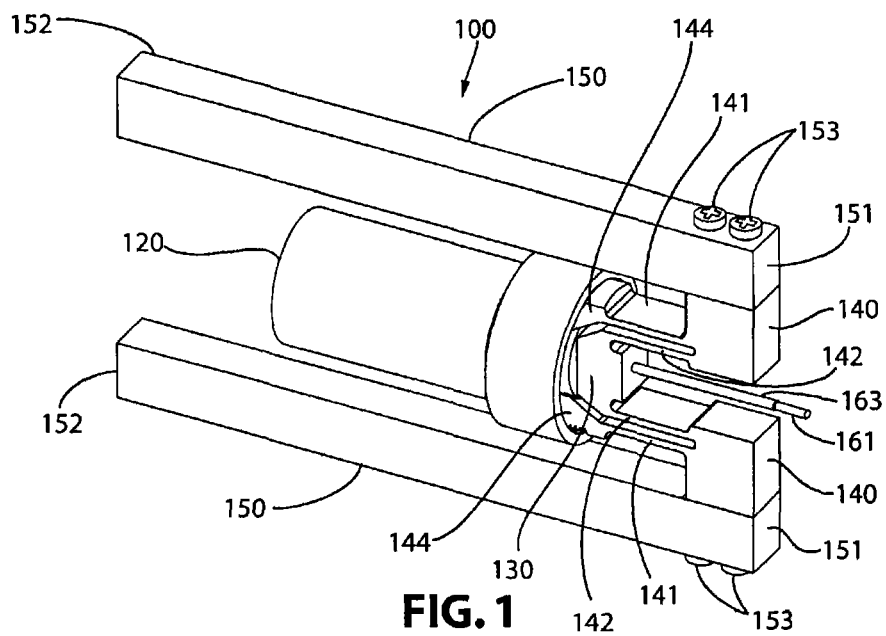
FIG. 1 is a perspective view of an embodiment of the actuator of the present invention having two actuating arms configured at a zero degree angle with respect to the smart material device within the compensator and a threaded compensator attachment.

While the following describes preferred embodiments of this invention with reference to the included figures, it is to be understood that this description is to be considered only as illustrative of the principles of the invention and is not to be imitative thereof, as numerous other variations, all within the scope of the invention, will readily occur to others in light of the disclosure in this detailed description.

Herein, it will also be understood that various embodiments of the present invention may be utilized as an actuator (in which motion is generated by the application of an electrical potential), as an energy capture device (in which motion is converted to electrical energy), or as a sensor (in which changes in the positions of the actuating arms or compensator are converted into electrical signals indicating such change). Accordingly, herein, the term "actuator" refers to the smart material apparatus of the present invention without limiting such apparatus to a particular use as an actuating, energy capture, or sensing device.

It will also be noted that in the illustrated embodiments, different embodiments comprise the same or similar components. Where the same component is suitable for use in different embodiments, the same reference number is used. For example, and without limitation, actuating arm 150 is illustrated as a common component that may be used in embodiments including 100, 300, 400, 500, and 600. Accordingly, the same number is used to indicate the common part used in the illustration of each assembly. Where components in different embodiments have a similar structure, but are not necessarily common parts, a similar number is used, but with a differing initial first digit, but common second and third digits. For example, and without limitation, actuating arms 150 and 250 are examples of actuating arms with similar structures adapted for use in different embodiments of the apparatus of the present invention, but need not be interchangeable parts. Furthermore, where variations of the same component are used, the same component number will be used with a prime or double prime to indicate each variation. For example, and without limitation, compensator 120 has variations 120 (with preload screw 128) and 120' and 120" each without preload screw 128, but with a different end configuration. Finally, it will be noted that letters are used herein to designate axes defined by two points through which the axis runs. Designations such as α, and β, are used to indicate angles between such axes in order to describe preferred angles appropriate for use in various embodiments described herein.

Glossary

Herein, the following terms shall have the following meanings:

The term "adapted" shall mean sized, shaped, configured, dimensioned, oriented and arranged as appropriate.

The term "smart material device" shall mean: a device comprising a piezoelectric material that expands when an electric potential is applied, or generates an electric charge when mechanical force is applied. Smart material devices include, without limitation, devices formed of alternating layers of ceramic piezoelectric material fired together (a so-called co-fired multilayer ceramic piezoelectric stack such as those available from suppliers including NEC) or a device formed of one or more layers of material cut from single crystal piezoelectric materials. In the foregoing, the term "piezoelectric material" also includes so-called "smart materials," sometimes created by doping known piezoelectric materials to change their electrical or mechanical properties.

The term "mechanical web" shall mean a structure comprising at least two compliant members and being adapted to translate motion to an actuating arm.

The term "activation" when used in conjunction with "actuator" or "smart material device" means application of an electrical potential and current suitable to cause the smart material device to expand in an amount sufficient to flex the compliant members of at least one mechanical web.

The definitions and meanings of other terms herein shall be apparent from the following description, the figures, and the context in which the terms are used.

DESCRIPTION OF PREFERRED EMBODIMENTS

Figure 2:
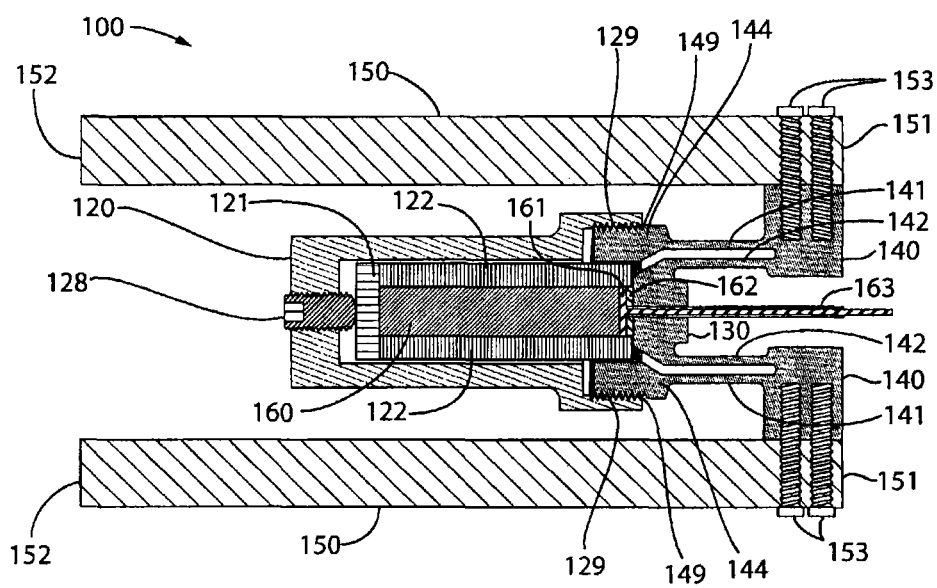
FIG. 2. is a side, cut-away view of the embodiment illustrated in FIG. 1.
Figure 3:
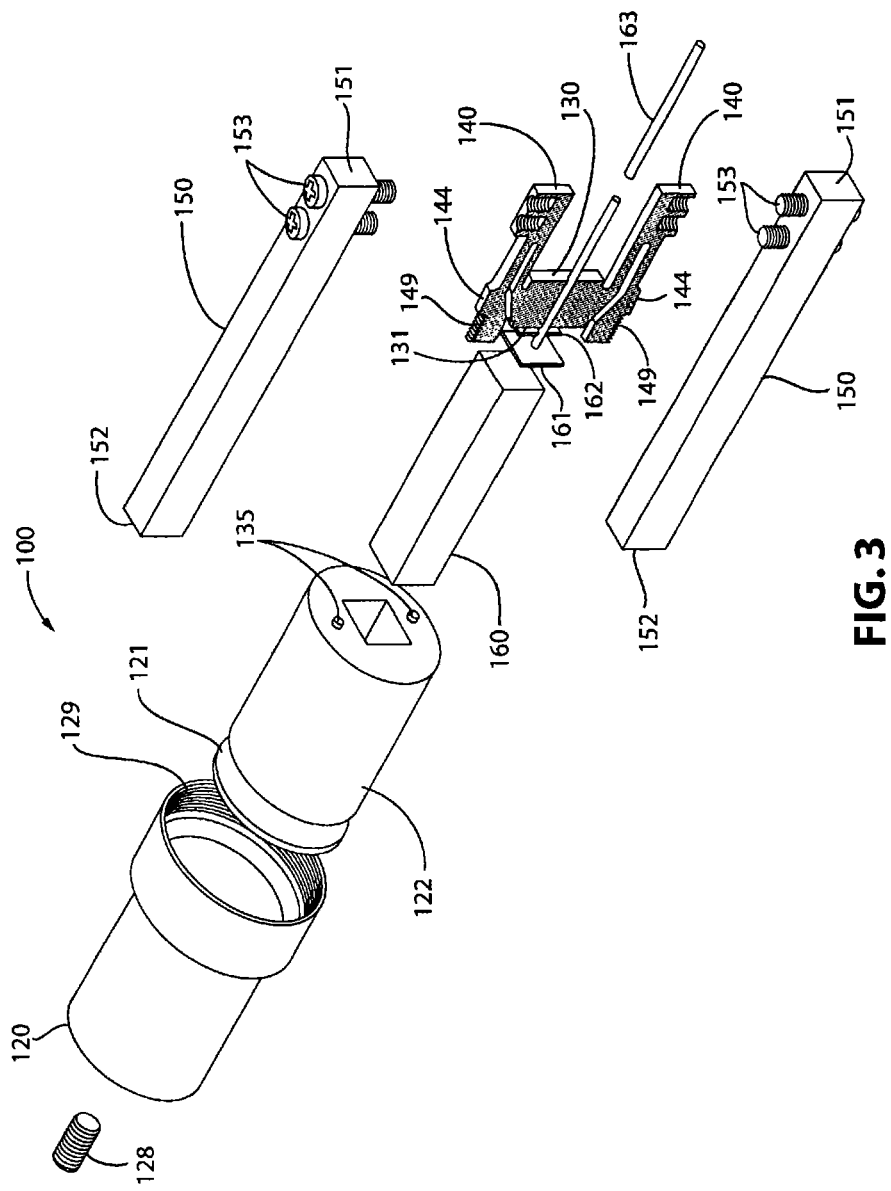
FIG. 3 is an exploded, perspective view of the embodiment illustrated in FIG. 1.
Figure 5A:
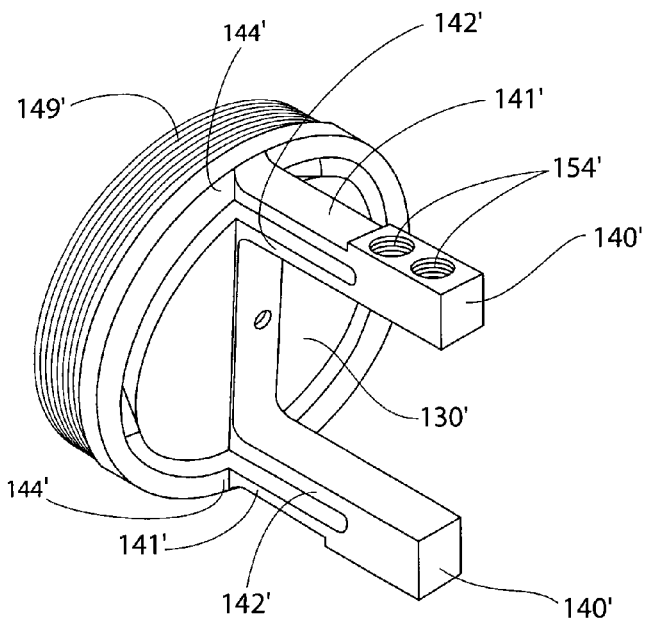
FIG. 5A is a perspective view of an alternate embodiment of mechanical webs, compensator attachment surface, and movable supporting member also suitable for use in the embodiments illustrated in FIGS. 1-3.
Figure 5B:
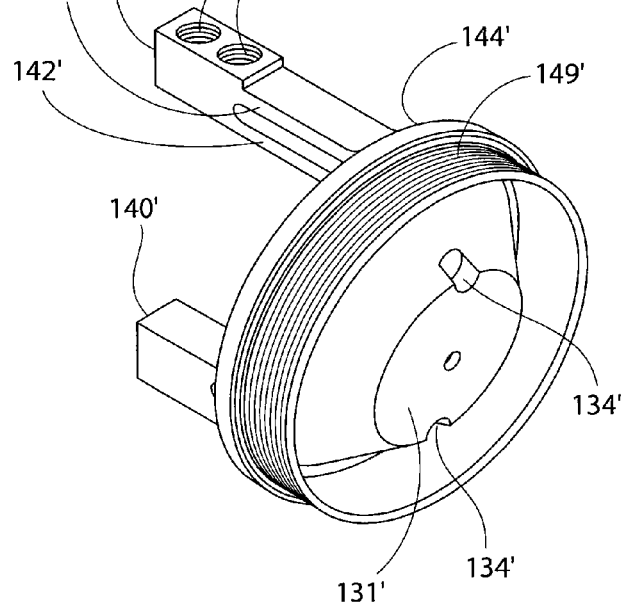
FIG. 5B is a second perspective view of the mechanical webs, compensator attachment surface, and movable supporting member illustrated in FIG. 5A, illustrating the second mounting surface.

FIGS. 1-3 illustrate assembled and exploded views of an embodiment of an actuator assembly 100 of the present invention having at least one, and in this case two, actuating arms 150. Actuator assembly 100 comprises a smart material device 160, a compensator 120, potting material 122, a movable supporting member 130, two mechanical webs 140, and two actuating arms 150. Embodiments in which only one actuating arm 150 is used are also possible, and would otherwise preferably be substantially identical.

Compensator 120 has a first mounting surface 121 adapted to receive one end of smart material device 160. The first mounting surface 121 may be integral to compensator 120, for example in the form of an indentation (not illustrated) or protrusion (not illustrated), or may be in the form of a separate thrust pad 121 situated between compensator 120 and smart material device 160. In the embodiments illustrated, smart material device 160 is assumed to comprise conductors at either end (not illustrated). When such smart material devices 160 are utilized, first mounting surface 121 and compensator 120 may be formed of conductive materials such as aluminum, steel, stainless steel or Invar, thereby allowing compensator 120 to act as a convenient connection point for an electrical ground for smart material device 160.

Smart material device 160 may be a stack of piezo-electric, or other smart material, or may be a single piezoelectric crystal. A key feature of smart material device 160 is that it will change shape, and in particular will expand to increased length, upon application of a suitable electric potential. While the size and particular smart material used may vary according to application, smart material devices from manufacturers including NEC-Tokin (including without limitation part numbers AE0707D43H33, and AE0505D44), EPCOS (including without limitation part numbers LN04/8534, LN04/8671, LN04/8672) Ceramtec, and Kyocera are suitable for embodiments of actuators of the present invention.

Smart material device 160 is situated between first mounting surface 121 and movable supporting member 130, which comprises second mounting surface 131. Movable supporting member 130 may be formed from a variety of materials including, without limitation stainless steel, steel, aluminum, titanium, ceramics or carbon fiber. Where a conductive material is used, it is desirable to include electrode 161 and first insulator 162 between smart material device 160 and movable supporting member 130. Electrode 161 may conveniently pass through movable supporting member 130 as shown, with second insulator 163 providing further insulation where electrode 161 passes through movable supporting member 130. Because smart material device 160 expands and contracts according to the application of an electric potential, it is desirable that first insulator 162 be formed of a rigid material, which may conveniently be a ceramic material, varieties of which are known to those of skill in the art. In this way, the expansion and contraction of smart material device 160 will be more fully imparted to movable supporting member 130 with less loss due to the compression and expansion of first insulator 162. Because movable supporting member 130 may move upon expansion and contraction of smart material device 160, it is also desirable that, where a tight tolerance is used between electrode 161 and movable supporting member 130, second insulator 163 comprises a low-friction material such as Teflon that will reduce friction and heat as movable supporting member 130 moves, while still providing electrical insulation.

It will be understood by those of skill in the art, that the foregoing describes only one possible arrangement of positive and negative electrodes and that many other arrangements, are possible depending on the location of the terminals on smart material device 160, and include, without limitation, insulating compensator 120 such that it may serve as a ground while movable supporting member 130 serves as a positive terminal without the benefit of electrode 161 or insulators 162, 163, or simply providing wired connections (not illustrated) between side terminals (not illustrated) on smart material device 160, running through compensator 120 or movable supporting member 130 to terminals.

As noted above, movable supporting member 130 comprises a second mounting surface 131. Second mounting surface 131 is opposed and substantially parallel to first mounting surface 121. This is desirable as it allows smart material device 160 to be compressed between first mounting surface 121 and second mounting surface 131, without generating significant angular forces on smart material device 160. Preventing angular movement of smart material device 160 has been found helpful in increasing the operational life of smart material device 160 and maintaining a substantially parallel arrangement between surfaces 121 and 131 can assist in preventing angular deflection. Additionally, pre-compressing, or "preloading" smart material device 160 has been found helpful in increasing the efficiency of smart material device 160 and, in turn, actuator apparatus 100. As illustrated in FIGS. 2 and 3, one means of providing such a pre-load is through preload screw 128, which engages first mounting surface 121. Tightening preload screw 128 increases preload, while loosening preload screw 128 reduces preload. Alternate means of applying preload to smart material device 160 are discussed below.

Mechanical webs 140 and 140' are illustrated in FIGS. 4A, 4B, and 5A, 5B respectively. Mechanical webs 140, 140' comprise a first compliant member 141, 141' attached to a compensator mounting surface 144, 144'. Compensator mounting surface 144, 144' further comprises means 149, 149' of attaching to compensator 120 to mechanical webs 140, 140'. The primary difference between the illustrated embodiments is that compensator mounting surfaces 144 are separated, while compensator mounting surfaces 144' are connected such that they form a continuous ring. Herein "ring" does not necessarily imply a round structure. Instead, it denotes merely a continuous closed structure, preferably not of an irregular shape.

In the embodiments illustrated in FIGS. 1-5B, the means of attaching to compensator 120 illustrated are threads 149, 149' adapted to engage matching threads 129 on compensator 120. Other means described further below may also be used. Mechanical webs 140, 140' may also conveniently comprise means of removably attaching actuating arms 150. As illustrated, threaded receptacles 154, 154' adapted to receive mechanical fasteners 153 are one example of such means. Other examples will be apparent to those of ordinary skill in the art in light of this description. Allowing for removably attaching arms is desirable as it allows common mechanical webs 140, 140' to be used with arms of different size, length, weight and configuration.

Second compliant members 142, 142' are attached to movable supporting member 130, 130'. Movable supporting member 130, 130' comprises second mounting surface 131, 131' opposed and substantially parallel to first mounting surface 121, as was discussed above. Smart material device 160 may then be affixed within compensator 120, between first mounting surface 121 second mounting surface 131, 131'. Smart material device 160 is preferably substantially surrounded by potting material 122, examples of which are known to those of skill in the art. It is further noted that, while potting material 122 is illustrated as being separate from smart material device 160, certain suppliers also offer suitable smart material devices 160 "pre-potted" to include potting material 122. It is preferred, but not required, that potting material 122 substantially fill the empty space between smart material device 160 and compensator 120.

As is discussed further below, in certain embodiments, it is preferred that twisting of smart material device 160 be resisted, for the same reasons discussed above that angular deflection during operation is undesirable. One convenient method of resisting twist is to include at least one, and preferably two, pins 135 in potting material 122. Receptacles 134, 134' in second mounting surface 131, 131' may then be adapted to receive pins 135 during assembly and, thus, resist twisting or rotation of smart material device 160. Other means of resisting twist including, without limitation (i) adhesives (not illustrated) between smart material device 160 or potting material 122 and second mounting surface 131, 131', and (ii) adhesives between potting material 122 and compensator 120, will be apparent to those of ordinary skill in the art in light of this description, and may also be used.

Actuating arms 150 comprises a first actuating arm end 151 attached to mechanical web 140, 140', and opposed second actuating arm end 152. It is preferred that actuating arm 150 be adapted to be removably attached so that actuating arms 150 of different sizes and materials, or adapted to achieve different angles (as is discussed further below) may be used with the same mechanical webs 140, 140'. One way of adapting actuating arms 150 for removable attachment is to provide fasteners 153 adapted to engage receptacles 154, 154' as illustrated. Other removable attachments means will be apparent to those of ordinary skill in the art in light of this description and may also be used.

Mechanical webs 140, 140'; compliant members 141, 141', 142, 142'; movable supporting member 130, 130' and compensator mounting surfaces 144, 144' are preferably formed in a single, integral unit. Appropriate materials include, without limitation, aluminum, stainless steel, titanium, Invar, carbon fiber, and ceramics known in the art.

Actuating arms 150 may also be formed of materials including, without limitation, aluminum, stainless steel, titanium, steel, carbon fiber, plastics or ceramics, depending on the application in which actuator assembly 100 will be put to use. It is noted that lighter weight materials such as carbon fiber and aluminum are preferred when actuator assembly 100 is to be adapted to applications requiring higher activation and deactivation frequencies.

During operation, application of a suitable electrical potential will cause smart material device 160 to expand substantially without angular movement, thereby urging movable supporting member 130, 130' away from first mounting surface 121 and, in turn, causing compliant members 141, 141', 142, 142' to flex. Actuating arm 150 will thereby move such that the motion of said second actuating arm end 152 is across a distance greater than the expansion of smart material device 160. In this way, actuator assembly 160 operates as a traditional actuator, converting electrical energy into mechanical motion. In other embodiments discussed further below, actuator assembly 100 can act as an energy capture device or sensor by attaching actuating arm 150 to a source of motion (not illustrated in FIGS. 1-5B). The source of motion (not illustrated in FIGS. 1-5B) causes actuating arm 150 to move, thereby flexing compliant members 141, 141', 142, 142' of mechanical webs 140, 140'. The flexing causes movable supporting member 130, 130' to compress or release smart material device 160, thereby generating an electrical signal that can be captured or used to determine the degree of motion.

Figure 6:
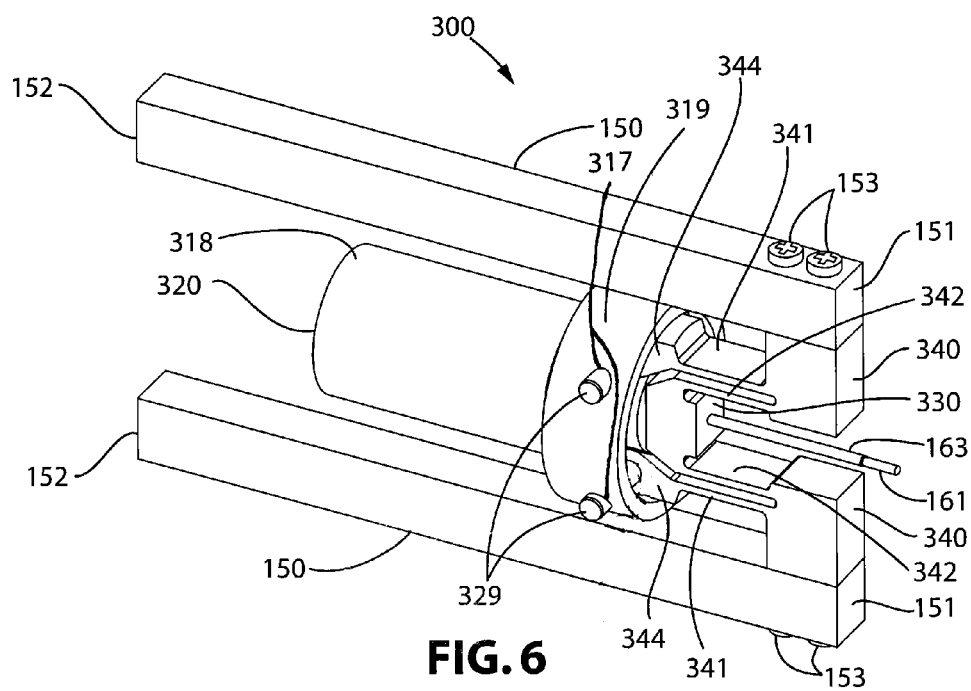
FIG. 6 is a perspective view of an embodiment of the actuator of the present invention having two actuating arms configured at a zero degree angle with respect to the smart material device within the compensator, and in which the compensator is affixed to the compensator mounting surface with mechanical fasteners in the form of pins inserted through the open end of the compensator.
Figure 7:
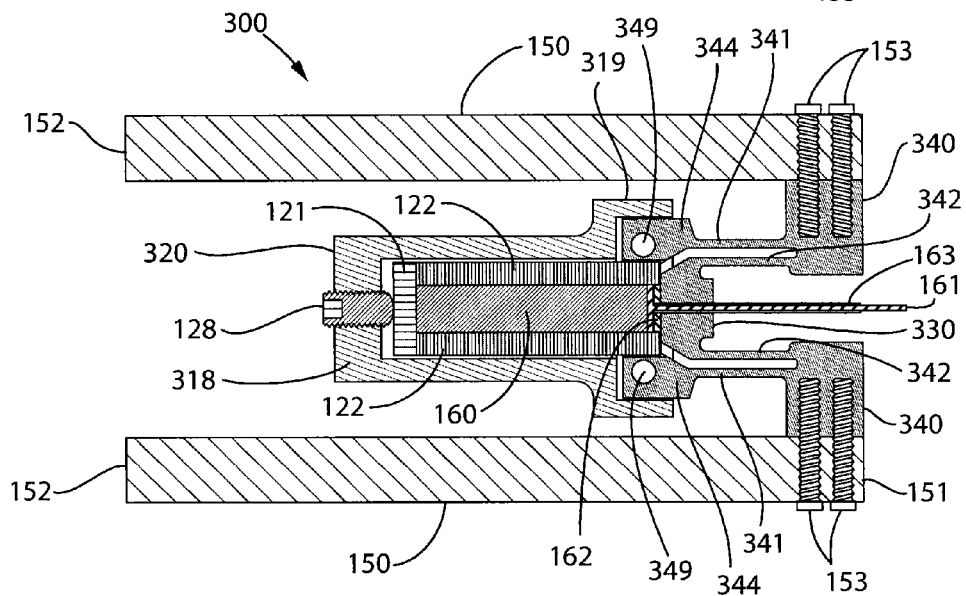
FIG. 7 is a side, cut-away view of the embodiment illustrated in FIG. 6.

FIGS. 6-13 illustrate embodiments of the actuator of the present invention having different means of attaching compensator embodiments to compensator mounting surface embodiments. Referring to FIGS. 6-7, actuator assembly 300 further comprises at least one, and preferably two, mechanical fasteners 329. Compensator 320 has a closed end 318, proximate to said mounting surface 121 and an opposed open end 319 proximate to compensator mounting surfaces 344. Compensator 320 has at least one, and preferably at least four, holes 317 proximate to open end 319. Mechanical fastener(s) 329 are adapted to be received by hole(s) 317. In the illustrated embodiment, fasteners 329 are pins. As illustrated, the means of attaching to compensator 320 comprises at least one, and preferably two, receptacle(s) 349 on compensator mounting surface 344. Receptacle(s) 349 are adapted to receive mechanical fastener(s) 329. In this way, compensator 320 may be attached to compensator mounting surface 344 by inserting, and in the case of pins 329 press-fitting, mechanical fastener(s) 329 through hole(s) 317 and into receptacle(s) 349. Where only a single mechanical fastener 329 is desired, a separate means (not illustrated) such as a lip (not illustrated) or other type of fastener (not illustrated) may be used to secure one side of compensator 320, while mechanical fastener 329 secures the other. Mechanical webs 340, compliant members 341, 342, and movable supporting member 330, are otherwise substantially identical in structure and operation to mechanical webs 140, compliant members 141, 142, and movable supporting member 130, previously described.

Figure 8:
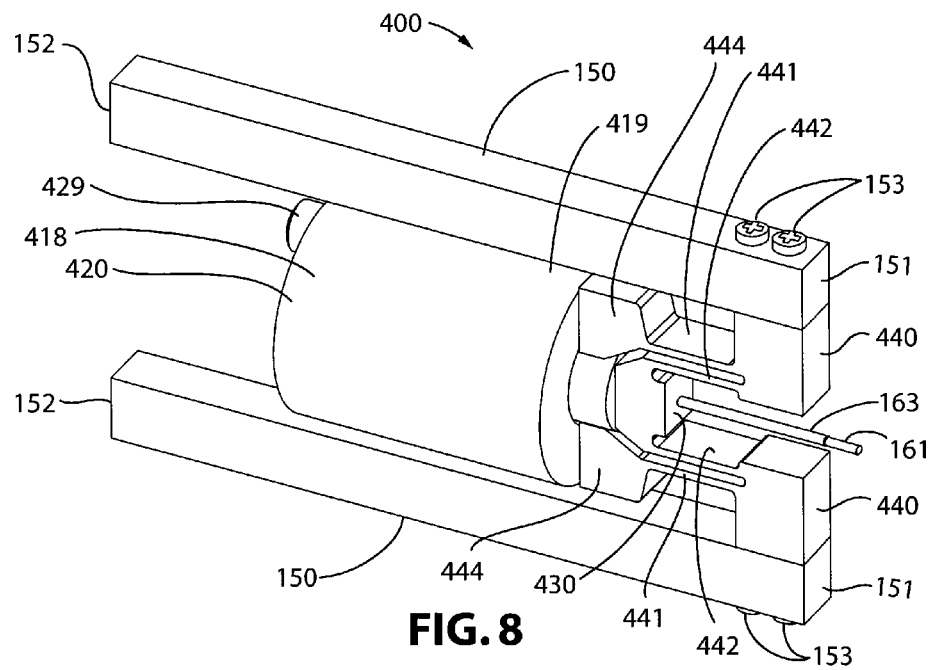
FIG. 8 is a perspective view of an embodiment of the actuator of the present invention having two actuating arms configured at a zero degree angle with respect to the smart material device within the compensator, and in which the compensator is affixed to the compensator mounting surface with mechanical fasteners in the form of bolts inserted through the closed end of the compensator.
Figure 9:
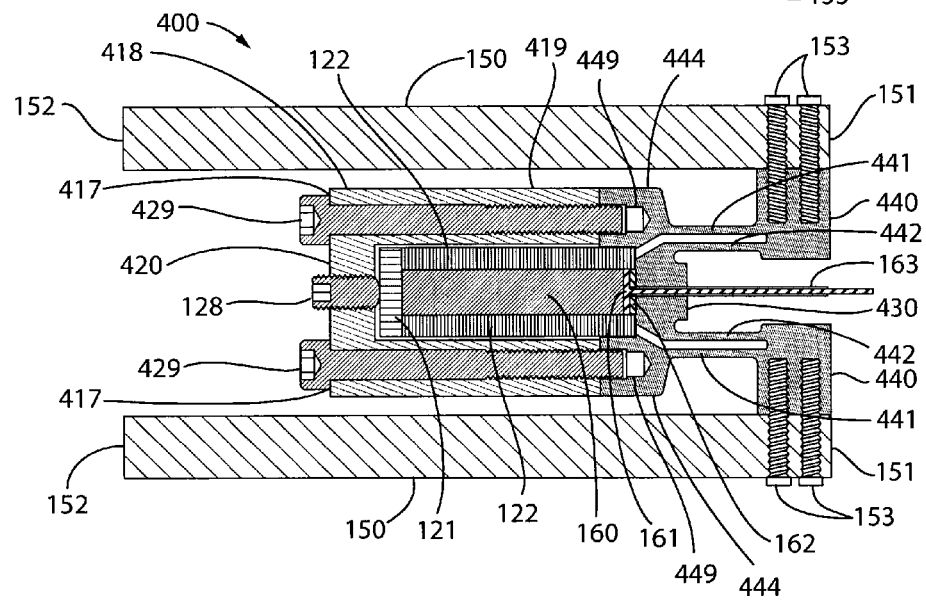
FIG. 9 is a side, cut-away view of the embodiment illustrated in FIG. 8.

Referring to FIGS. 8-9, actuator assembly 400 further comprises at least one, and preferably two, mechanical fasteners 429. Compensator 420 has a closed end 418, proximate to mounting surface 121 and an opposed open end 419 proximate to compensator mounting surfaces 444. Closed end 418 comprises at least one, and preferably at least two, hole(s) 417, adapted to receive mechanical fastener(s) 429. In the illustrated embodiment, mechanical fastener(s) 429 are bolts, but other fasteners including without limitation screws, rivets or pins may also be used. As illustrated, the means of attaching to compensator 420 comprises at least one, and preferably two, receptacle(s) 449 on compensator mounting surface 444. Receptacle(s) 449 are adapted, in the case of the illustrated embodiment threaded, to receive mechanical fastener(s) 449. In this way, compensator 420 may be attached to compensator mounting surface 444 by inserting mechanical fastener(s) 429 through hole(s) 417, into receptacle(s) 449 and, in the case of threaded fasteners, tightening. Where only a single mechanical fastener 429 is desired, a separate means (not illustrated) such as a lip (not illustrated) or other type of fastener (not illustrated) may be used to secure one side of compensator 420 while mechanical fastener 429 secures the other. Mechanical webs 440, compliant members 441, 442, and movable supporting member 430, are otherwise substantially identical in structure and operation to mechanical webs 140, compliant members 141, 142, and movable supporting member 130, previously described.

Figure 10:
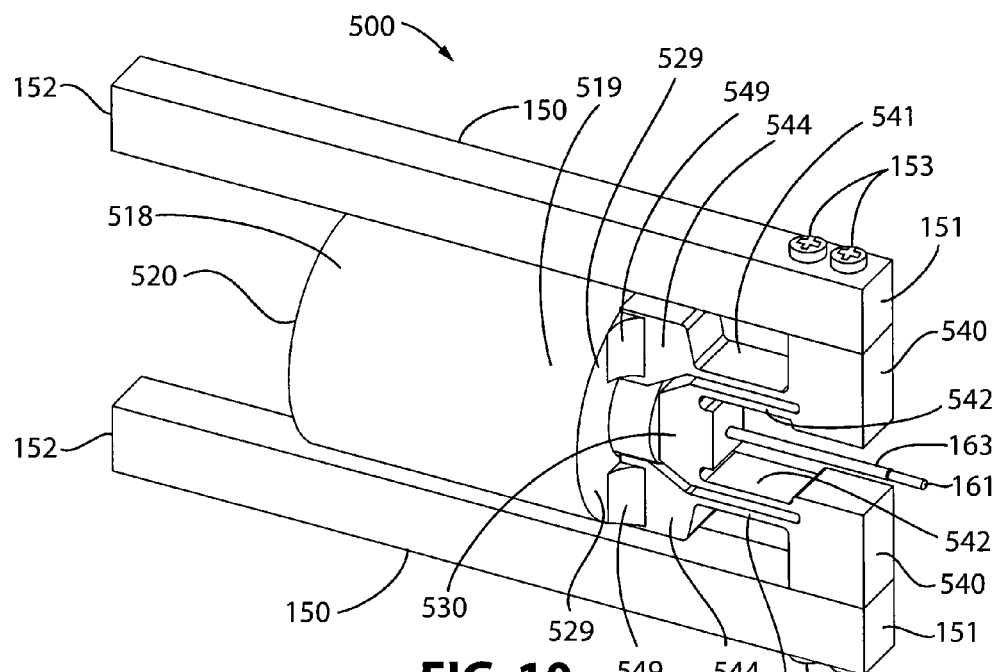
FIG. 10 is a perspective view of an embodiment of the actuator of the present invention having two actuating arms configured at a zero degree angle with respect to the smart material device within the compensator, and in which the compensator is affixed to the compensator mounting surface with welds.
Figure 11:
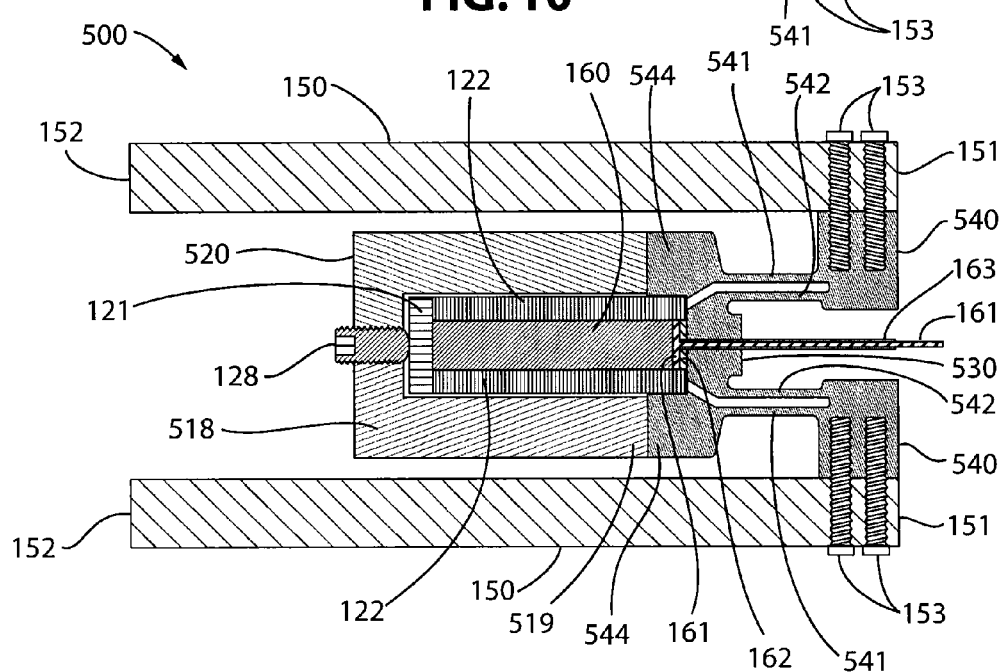
FIG. 11 is a side, cut-away view of the embodiment illustrated in FIG. 10.

Referring to FIGS. 10-11, actuator assembly 500 comprises compensator 520, which has a closed end 518, proximate to first mounting surface 121 and an opposed open end 519 proximate to compensator mounting surfaces 544. Compensator 520 comprises a facing surface 529 proximal to open end 519 and substantially parallel to at least one face on said compensator mounting surface 544. As illustrated, the means of attaching to compensator 520 comprises at least one, and preferably at least two weld(s) 549 joining facing surface 529 with compensator mounting surface 544. In this way, compensator 520 may be attached to compensator mounting surface 544 by compressing compensator 520 against compensator mounting surface 544 and welding facing surface 529 to compensator mounting surface 544. Where only a single weld 549 is desired, a separate means (not illustrated) such as a lip (not illustrated) or other type of fastener (not illustrated) may be used to secure one side of compensator 520 while weld 549 secures the other. Mechanical webs 540, compliant members 541, 542, and movable supporting member 530, are otherwise substantially identical in structure and operation to mechanical webs 140, compliant members 141, 142, and movable supporting member 130, previously described.

Figure 12:
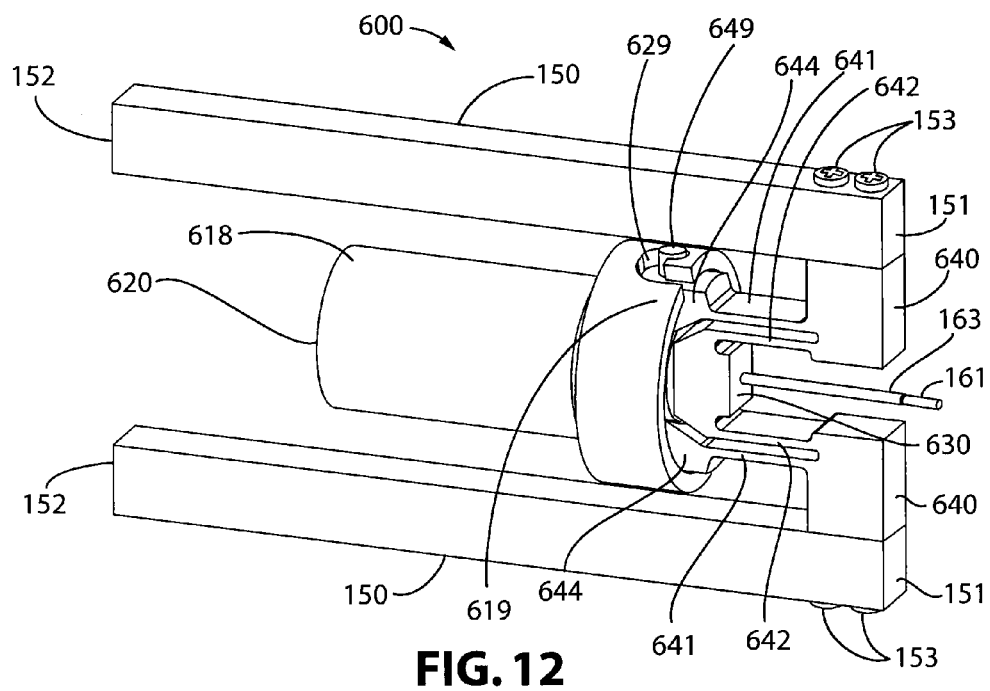
FIG. 12 is a perspective view of an embodiment of the actuator of the present invention having two actuating arms configured at a zero degree angle with respect to the smart material device within the compensator, and in which the compensator is affixed to the compensator mounting surface with a pin adapted to engage a slot in the compensator.
Figure 13:
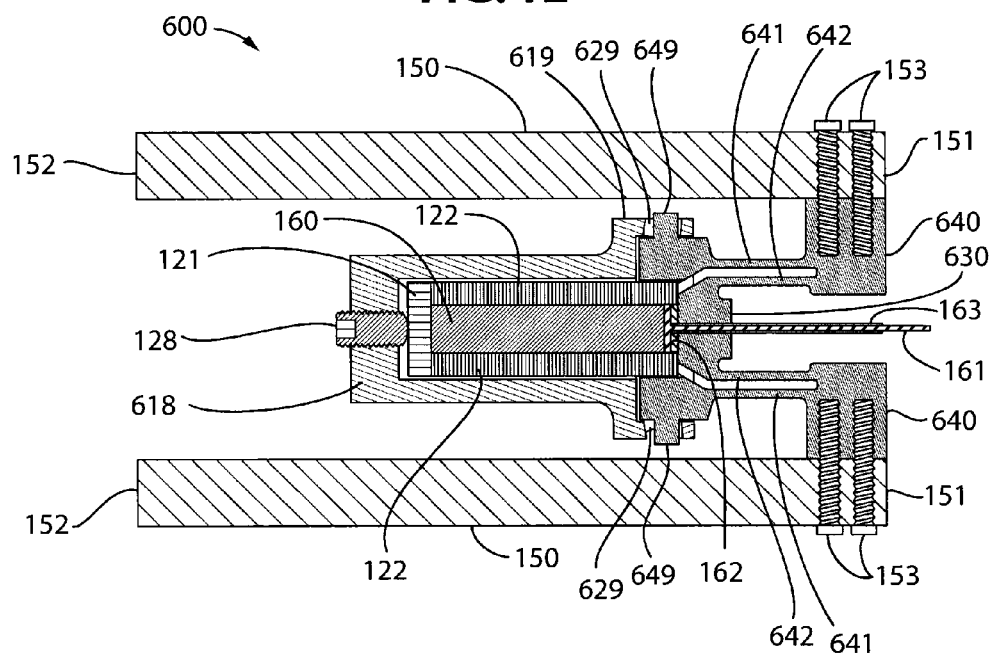
FIG. 13 is a side, cut-away view of the embodiment illustrated in FIG. 12.

Referring to FIGS. 12-13, actuator assembly 600 comprises compensator 620, which has a closed end 618, proximate to first mounting surface 121 and an opposed open end 619 proximate to compensator mounting surfaces 644. Open end 619 comprises at least one, and preferably two, slots 629 and compensator mounting surface 644 comprises at least one, and preferably two, pins 649, adapted to be received by slots 629. In this way, compensator 620 may be attached to compensator mounting surface 644 by engaging pins 649 into slots 629. Where only a single pin 649 is desired, a separate means (not illustrated) such as a lip (not illustrated) or other type of fastener (not illustrated) may be used to secure one side of compensator 620 while pin 649 secures the other. Mechanical webs 640, compliant members 641, 642, and movable supporting member 630, are otherwise substantially identical in structure and operation to mechanical webs 140, compliant members 141, 142, and movable supporting member 130, previously described.

Other means of attaching compensator 120 to compensator mounting surface 144 may also be used, and will be apparent to those of skill in the art in light of this description including, without limitation, ratcheting teeth (not illustrated) on compensator mounting surface 144 adapted to engage matching teeth (not illustrated) on compensator 120, adhesives (not illustrated), epoxies (not illustrated), clamps (not illustrated), flanges (not illustrated), and a variety of other mechanical fasteners (not illustrated) known in the art.

As has been described, it is desirable to preload smart material device 160 during assembly of actuator assembly 100. One method of preloading via preload device or screw 128 has already been described. An alternate means of preloading smart material device 160 is to adapt compensator 120 and compensator mounting surface 144 such that when compensator 120 is fully attached, smart material device 160 is preloaded to a predetermined amount without further adjustment. When such preloading means is used, no preload device 128 is needed. Accordingly, it is possible to adapt compensator 120, first mounting surface 121, and movable supporting member 130 to apply preload without further adjustment.

Figure 14:
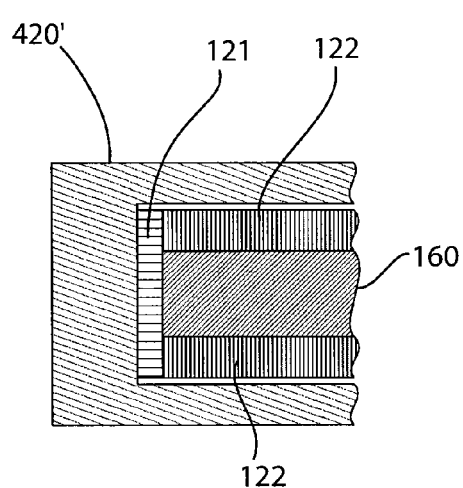
FIG. 14 is a detail, side, cut-away view of an embodiment of a compensator suitable for use with actuators of the present invention that does not include a preload device, and is adapted for assembly without turning.

FIG. 14 illustrates one method of adapting compensator 420' appropriate for such an arrangement. As shown, thrust plate 121 abuts against compensator 420', thereby applying the necessary compression to smart material device 160 when compensator 420' is secured during assembly. As is apparent from the description and explanation of FIGS. 8 and 9, when compensator 420 is secured, no twisting is required. This is significant because it is desirable to prevent smart material device 160 from being subject to substantial twisting forces. If no preload device 128 is used, and attachment does not require twisting, the arrangement shown in compensator 420' may be used.

Figure 15:
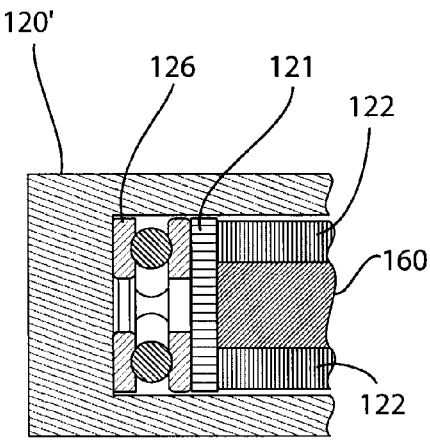
FIG. 15 is a detail, side, cut-away view of an embodiment of a compensator suitable for use with actuators of the present invention that does not include a preload device, and is adapted for assembly with turning by incorporation of a thrust bearing as part of the first mounting surface.
Figure 16:
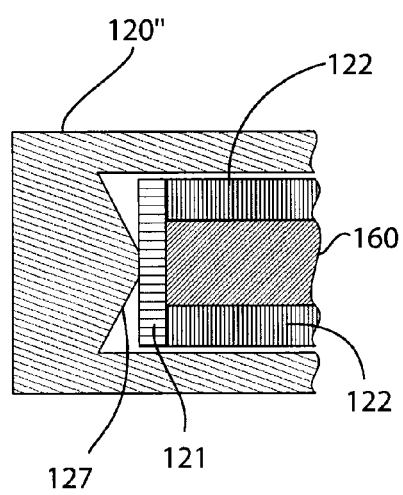
FIG. 16 is a detail, side, cut-away view of an embodiment of a compensator suitable for use with actuators of the present invention that does not include a preload device, and is adapted for assembly with turning by incorporation of an extension on the inside of the compensator adapted to engage a thrust plate adapted to rotate thereupon during assembly.
Figure 17:
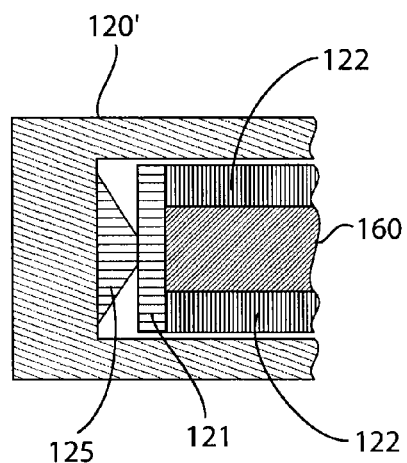
FIG. 17 is a detail, side, cut-away view of an embodiment of a compensator suitable for use with actuators of the present invention that does not include a preload device, and is adapted for assembly with turning by incorporation of a conical first thrust plate adapted to engage a second thrust plate, which in turn is adapted to rotate upon said first thrust plate during assembly.

In embodiments where twisting is needed during assembly, for example when threading compensator 120 onto attachment means 149, 149' as illustrated in FIGS. 1-5B, it is preferred that other methods of avoiding twisting of smart material device 160 during assembly be employed, some examples of which are illustrated in FIGS. 15-17. As illustrated in FIG. 15, first mounting surface 121 may comprise a thrust bearing 126 adapted to allow compensator 120' to rotate without imparting substantial twisting force to said smart material device 160. When such an arrangement is used, smart material device 160 may be held substantially in place by the engagement of pin(s) 135 in receptacle(s) 134, 134' during tightening of compensator 120' on compensator mounting surface(s) 144, 144' as shown in FIGS. 1-5B.

Alternatively, as illustrated in FIG. 16, compensator 120" may comprises an inwardly extending protrusion 127 adapted to engage first mounting surface 121, in this case a thrust plate. Thrust plate/first mounting surface 121 and protrusion 127 are adapted to allow compensator 120" to rotate without imparting substantial twisting force to smart material device 160. As with the previously described embodiment, smart material device 160 is preferably held substantially in place by the engagement of pin(s) 135 in receptacle(s) 134, 134' during tightening.

A further alternative utilizing compensator 120', conical thrust plate 125 and first mounting surface/thrust plate 121, is illustrated in FIG. 17. As illustrated, first mounting surface/first thrust plate 121 and a second conical thrust plate 125 are situated between smart material device 160 and compensator 120'. First thrust plate 121 and said second thrust plate 125 are adapted to allow compensator 120' to rotate without imparting substantial twisting force to said smart material device 160. Smart material device 160 will preferably be held substantially in place during assembly by the engagement of pin(s) 135 in receptacle(s) 134 during tightening, as has been previously described.

Preferably thrust pads 121, 125, thrust bearing 126, and compensators 420', 120' and 120" will each be conductive, thereby allowing compensators 420', 120' and 120" to be electrically connected to smart material device 160. Otherwise, other means (not illustrated) of forming an electrical connection with smart material device 160 may be used including, without limitation electrodes (not illustrated) similar to electrode 161 adapted to extend through thrust pads 121, 125, thrust bearing 126, or providing a wired connection (not illustrated) to a side terminal (not illustrated) on smart material device 160.

The angles of the actuating arms may also be varied in different embodiments. FIGS. 18 and 19 illustrate embodiments in which actuating arms 150 are mounted in forward and backward facing directions on mechanical webs 140. To illustrate the relative angles, a central axis A is illustrated as running through the center of smart material device 160 (within compensator 120) and extending through first mounting surface 121 (not illustrated on FIGS. 18-21) and through second mounting surface 131 (not illustrated on FIGS. 18-21). As shown, central axis A extends through the center of electrode 161 and the center of compensator 120. For each actuating arm 150, actuating arm axes B, C, D, E extend through first actuating arm end 151 and second actuating arm end 152 (not illustrated in FIGS. 18-19). The angle between central axis A and each of actuating arm axes B, C, D, E may thus be measured, and shall be referred to herein as angle $\alpha$. Preferably, each angle $\alpha$ will be substantially identical for all arms in a given actuator apparatus, but this is not strictly required. Accordingly, only one such angle $\alpha$ is illustrated for each embodiment. As shown, angle $\alpha$ is approximately zero degrees in FIG. 18 and approximately one hundred eighty degrees in FIG. 19.

As illustrated in FIGS. 20 and 21, actuating arms 250 may be adapted for mounting at a variety of angles, including, without limitation, by adapting first actuating arm end 251 as illustrated. In the embodiment illustrated in FIG. 20, angle $\alpha$ is approximately forty-five degrees. As illustrated in FIG. 21, angle $\alpha$ is approximately one hundred thirty-five degrees.

It will be understood from the foregoing that, when angle $\alpha$ is less than ninety degrees, mechanical webs 140 are adapted such that second actuating arm ends 152, 252 will move toward smart material device 160 and each other substantially upon activation of smart material device 160. When angle $\alpha$ is greater than ninety degrees, second actuating arm ends 152, 252 will move apart substantially upon activation of smart material device 160. It is disclosed herein, however, that certain angles $\alpha$ can operate more efficiently than others in terms of the work generated by smart material device 160, often depending on the length of actuating arms 150, 250. In particular, angles $\alpha$ between zero and fifty, and between one hundred thirty and one hundred eighty degrees are likely to be the most efficient in common configurations. Determination of optimal angles $\alpha$ may be done empirically as they will vary based on the particular application and actuator configuration.

Figure 22:
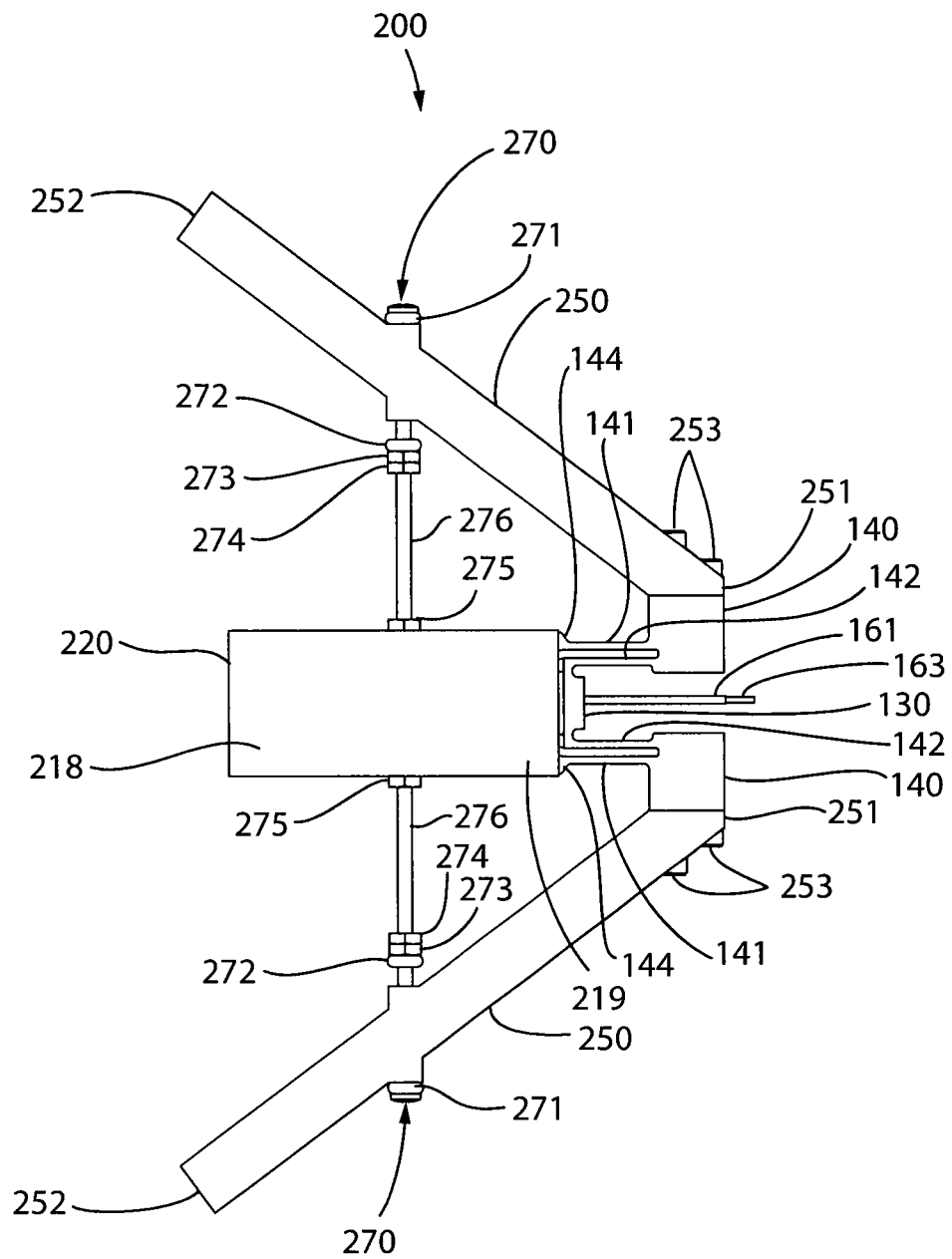
FIG. 22 is a side view of an embodiment of the actuator of the present invention having two actuating arms configured at approximately a forty-five degree angle with respect to the smart material device within the compensator, each actuating arm having a dampener adapted to assist in high speed operation.

As has already been noted, actuators according to the present invention may be adapted for high-speed operation in which the frequency of repeated activation and deactivation is high. Referring to FIG. 22, actuator assembly 200 comprises dampener assemblies 270 attached to compensator 220 and adapted to improve performance during such high-speed operation by acting to limit the motion of actuating arms 250 in either direction. Herein, the term dampener assembly is used to refer to a device having at least one pliable stop and being adapted to limit the motion of actuating arms 150 or 250 respectively. One preferred embodiment is shown in FIG. 22, in which a threaded fastener 276 is adapted to extend through actuating arm 250 and attach to compensator 220, which preferably comprises a threaded receptacle (not illustrated). First locking nut 275 may conveniently be cinched down on compensator 220 to prevent loosening of fastener 276 during operation. Pliable stops 271 and 272 are on fastener 276 on either side of actuating arm 250 and may conveniently be O rings, or any material (including without limitation urethane, plastic, rubber, or a variety of synthetic materials) adapted to be compliant such that first and second pliable stops 271 and 272 will resist excessive movement of actuating arms 250 preferably without hard stops that would result in ringing. Third locking nut 273 may be positioned to locate second pliable stop 272 and then second locking nut 274 may be cinched against third locking nut 273 to prevent unintended repositioning of second pliable stop 272 during operation. First pliable stop 271 may conveniently be held in position by the head or other end of fastener 276.

It will be understood that the illustrated assembly 270 is but one embodiment of a dampener suitable for use with actuator embodiments of the present invention. Other dampener assemblies (not illustrated) may also be used, each preferably including at least one and preferably two pliable stops, each adapted to restrict excess arm movement in one direction. Alternate embodiments of suitable dampeners will be apparent to those of skill in the art in light of this description and the present invention should not be construed to be limited to the illustrated embodiments.

Figure 23:
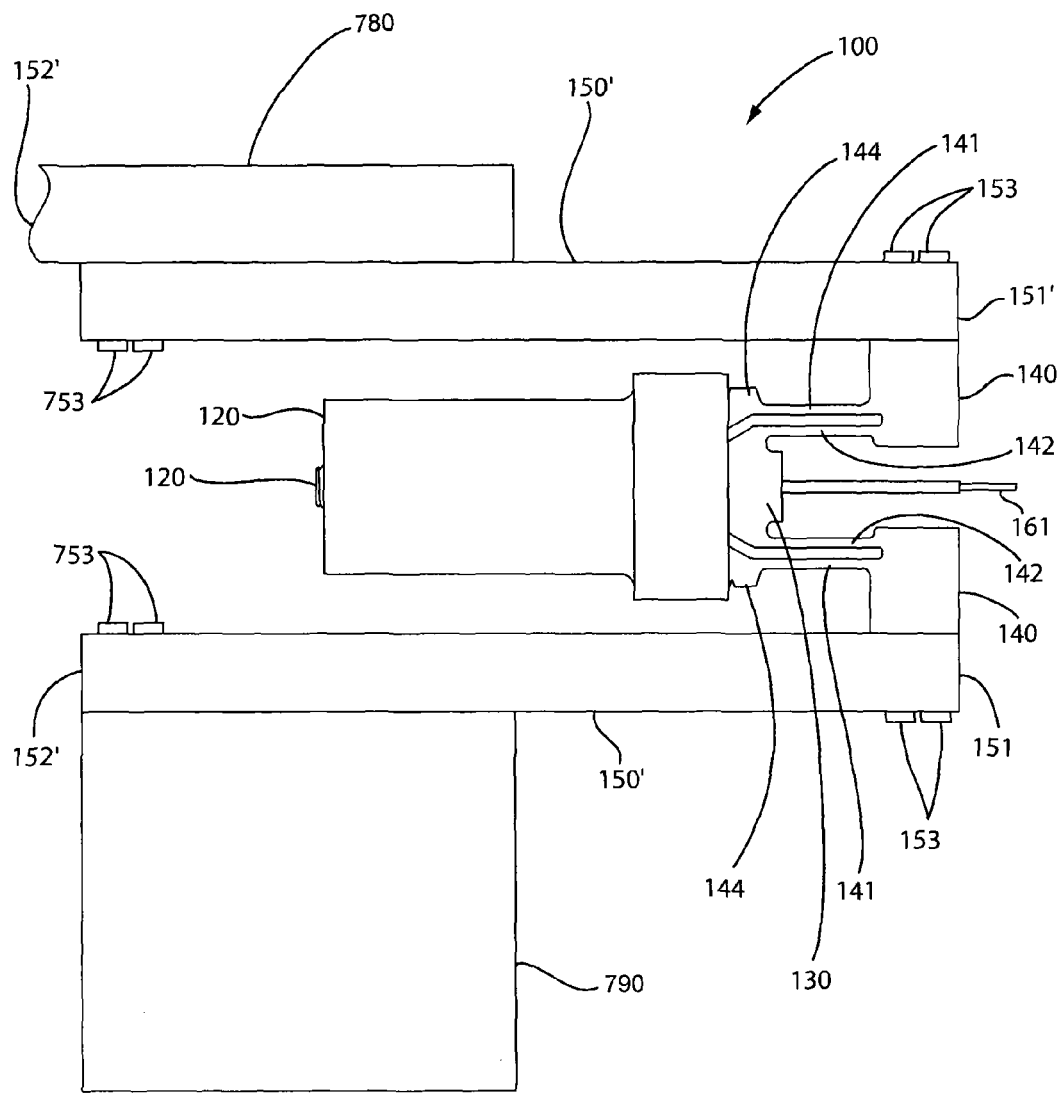
FIG. 23 is a side view of an embodiment of the actuator of the present invention adapted to operate as an energy capture device or as a sensor.

Further uses of the actuator of the present invention are as a sensor or as an energy capture device. FIG. 23 illustrates actuator assembly 100 adapted to operate in such a manner. Lower actuating arm 150' is adapted to attach to source of motion 790. While many such attachments are possible, the illustrated embodiment shows a preferred method in which mechanical fasteners 753 extend through actuating arm 150' and into source of motion 790. Source of motion 790 may be any convenient source of vibration or motion including, without limitation, a pump, electric motor, vibrating pipe, engine, or any other object that vibrates or otherwise moves. If second actuating arm ends 152' are adapted to comprise tabs, flaps, fins, or similar protrusions (not illustrated), the source of motion could be a turbulent stream of fluid or gas as well, with actuator assembly 100 positioned therein.

The efficiency of actuator assembly 100 when used in this manner may sometimes be enhanced by attaching the other second actuating arm end 152' to a rigid supporting structure 780 such as a wall or bracket or other support. In this manner, the movement of source of motion 790 acts to compress actuating arms 150' together or stretch actuating arms 150' apart, aided by the support of supporting structure 780.

When actuator assembly 100 is operated as an energy capture device, substantially upon movement of source of motion 790, lower actuating arm 150' causes compliant members 141, 142 to flex, thereby causing movable supporting member 130 to move. That movement in turn causes smart material device 160 to generate electrical energy. That electrical energy can then be captured in any convenient electrical load (not illustrated) including, without limitation a circuit (not illustrated) adapted to charge a battery (not illustrated) or capacitive device (not illustrated), thereby converting otherwise wasted mechanical energy into useful electrical energy.

When actuator assembly 100 is operated as a sensor, the movement of movable supporting member 130 causes smart material device 160 to generates an electrical signal that indicates the movement of source of motion 790. As will be apparent to those of skill in the art in light of this description, that electrical signal may then be processed by commonly understood sensor circuitry (not illustrated) to determine the degree of movement and, in some cases, its direction and speed. Thus, the embodiment illustrated in FIG. 23 also provides an example of how actuator assembly 100 may be used as a sensor. As will be understood by those of skill in the art in light of this description, the range of possible sensing uses for the present invention is virtually unlimited.

Finally, it is disclosed herein that any of the embodiments of the actuator of the present invention may be further optimized to account for expansion and contraction resulting from temperature changes. In many cases, unloaded smart material device 160 will have a low, or even negative, coefficient of thermal expansion. As has been discussed, it is desirable in certain applications for smart material device 160 to be subject to a predetermined amount of compression, or preload. Applying preload will tend to raise the coefficient of thermal expansion of smart material device 160. Accordingly, smart material device 160 may be said to have a first coefficient of thermal expansion in its preloaded state.

Compensators 120, 120', 120", 220, 320, 420, 520, 620 and compensator mounting surfaces 144, 344, 444, 544, 644 will also each expand and contract according temperature changes according to their own coefficients of thermal expansion. Where the combined coefficient of thermal expansion of the assembled compensator/mounting surface pair differs from the first coefficient of thermal expansion of smart material device 160, temperature changes can cause the location of actuating arms 150, 150', 250 to change, both for their activated states and when at rest. Where the combined coefficient of thermal expansion of the assembled compensator/ring pair is balanced with the first coefficient of thermal expansion of smart material device 160, however, are balanced, actuating arms 150, 150', 250 will tend to remain in their intended positions as temperatures vary.

To address this concern in applicable embodiments of actuator assemblies 100, 200, 300, 400, 500, 600, compensators 120, 120', 120", 220, 320, 420, 520, 620 and compensator mounting surfaces 144, 344, 444, 544, 644 may be formed from materials having different coefficients of thermal expansion. One such material suitable for compensator mounting surfaces 144, 344, 444, 544, 644 is 17-4 stainless steel, while a material having a different coefficient of thermal expansion suitable for compensators 120, 120', 120", 220, 320, 420, 520, 620 would be Invar. Where compensator compensators 120, 120', 120", 220, 320, 420, 520, 620 and compensator mounting surfaces 144, 344, 444, 544, 644 are selected from materials with different coefficients of thermal expansion, they may be sized (for example by increasing the length of compensator mounting surfaces 144, 344, 444, 544, 644 and decreasing length of compensator 120, 120', 120", 220, 320, 420, 520, 620), such that, when joined, the combined coefficient of thermal expansion of the compensator/mounting surface assembly is substantially equal to the first coefficient of thermal expansion of smart material device 160 at its determined preload. In this way, as temperatures change, the expansion or contraction of the compensator/mounting surface assembly will substantially match the expansion or contraction of smart material device 160 attributable to thermal conditions. As a result, a substantially consistent arm position will be maintained and operating efficiency can be enhanced.

Other variations and embodiments of the present invention will be apparent to those of ordinary skill in the art in light of this specification, all of which are within the scope of the present invention as claimed.

We claim:

1. An actuator apparatus comprising a smart material device, an enclosed compensator, a movable supporting member, two mechanical webs, and at least one actuating arm wherein
    (a) said compensator has a first mounting surface,
    (b) said mechanical webs comprise a first compliant member attached to a compensator mounting surface further comprising means of attaching to said compensator, and a second compliant member attached to said movable supporting member
    (c) said movable supporting member comprises a second mounting surface opposed and substantially parallel to said first mounting surface,
    (d) said actuating arm comprises a first actuating arm end attached to one said mechanical web and an opposed second actuating arm end; and
    (e) said smart material device is affixed within said compensator, between said first mounting surface and said second mounting surface and is substantially surrounded by said compensator;
whereby
application of an electrical potential causes said smart material device to expand substantially without angular movement of said smart material device, thereby urging said movable supporting member away from said first mounting surface and causing said compliant members to flex, thereby moving said actuating arm such that motion of said second actuating arm end is across a distance greater than the expansion of said smart material device.

2. The actuator apparatus of claim 1 comprising two said actuating arms wherein
    (a) said first actuating arm end of each said actuating arm is attached to one said mechanical web;
    (b) said actuating arms are spaced around said smart material device; and
    (c) said mechanical webs are adapted such that substantially upon flexing of said compliant members said second actuating arm ends move toward said smart material device.

3. The actuator apparatus of claim 2 wherein
    (a) a central axis through the center of said smart material device extends through said first mounting surface and said second mounting surface;
    (b) for each actuating arm, an actuating arm axis extends through said first actuating arm end and said second actuating arm end; and
    (c) the angles between said central axis and each said actuating arm axis is no more than fifty degrees.

4. The actuator apparatus of claim 1 comprising two said actuating arms wherein
    (a) said first actuating arm end of each said actuating arm is attached to one said mechanical web;
    (b) a central axis through the center of said smart material device extends through said first mounting surface and said second mounting surface;
    (c) for each actuating arm, an actuating arm axis extends through said first actuating arm end and said second actuating arm end;
    (d) the angle between said central axis and said actuating arm axis is greater than ninety degrees; and
    (e) said mechanical webs are adapted such that substantially upon flexing of said compliant members said second actuating arm ends move apart.

5. The actuator apparatus of claim 4 wherein the angles between said central axis and each said actuating arm axis is at least one hundred thirty degrees and no more than one hundred eighty degrees.

6. The actuator apparatus of claim 1 wherein said compensator mounting surfaces of said mechanical webs are connected such that said compensator mounting surfaces form a continuous ring.

7. The actuator apparatus of claim 1 wherein said actuating arm is removably attached to said mechanical web, and said mechanical web is formed of a material different from the material forming said actuating arm.

8. The actuator apparatus of claim 1 wherein
   (a) said compensator comprises compensator threads;
   (b) said means of attaching to said compensator comprise threads on said compensator mounting surface adapted to engage said compensator threads;
whereby said compensator may be attached to said compensator mounting surface by threading said compensator onto said compensator mounting surface.

9. The actuator apparatus of claim 8 further comprising potting material within said compensator and substantially surrounding said smart material device wherein
   (a) said potting material comprises at least one pin;
   (b) said second mounting surface comprises at least one receptacle adapted to receive said pin;
   (c) said first mounting surface comprises a thrust bearing adapted to allow said compensator to rotate about said smart material device without imparting substantial twisting force to said smart material device;
whereby
said smart material device is held substantially in place by the engagement of said pin in said receptacle during tightening of said compensator on said compensator mounting surface.

10. The actuator apparatus of claim 8 wherein
    (a) said potting material comprises at least one pin;
    (b) said second mounting surface comprises at least one receptacle adapted to receive said pin;
    (c) said first mounting surface comprises a first thrust plate and a second thrust plate between said smart material device and said compensator;
    (d) said first thrust plate and said second thrust plate are adapted to allow said compensator to rotate about said smart material device without imparting substantial twisting force to said smart material device;
whereby
said smart material device is held substantially in place by the engagement of said pin in said receptacle during tightening of said compensator on said compensator mounting surfaces.

11. The actuator apparatus of claim 8 wherein
    (a) said potting material comprises at least one pin;
    (b) said second mounting surface comprises at least one receptacle adapted to receive said pin;
    (c) said first mounting surface comprises a thrust plate between said smart material device and said compensator;
    (d) said compensator comprises an inwardly extending protrusion adapted to engage said thrust plate; and
    (e) said thrust plate and said protrusion are adapted to allow said compensator to rotate about said smart material device without imparting substantial twisting force to said smart material device;
whereby
said smart material device is held substantially in place by the engagement of said pin in said receptacle during tightening said compensator on said compensator mounting surfaces.

12. The actuator apparatus of claim 1 further comprising at least one mechanical fastener wherein
    (a) said compensator has a closed end proximate to said first mounting surface and an opposed open end;
    (b) said closed end comprises at least one hole adapted to receive said mechanical fastener;
    (c) said means of attaching to said compensator comprise at least one receptacle on said compensator mounting surface adapted to receive said mechanical fastener;
whereby said compensator may be attached to said compensator mounting surface by inserting said mechanical fastener through said hole and into said receptacle.

13. The actuator apparatus of claim 1 further comprising at least one mechanical fastener wherein
    (a) said compensator has a closed end proximate to said first mounting surface and an opposed open end;
    (b) said compensator has at least one hole proximate to said open end, said hole being adapted to receive said mechanical fastener;
    (c) said means of attaching to said compensator comprises at least one receptacle on one said compensator mounting surface adapted to receive said mechanical fastener;
whereby said compensator may be attached to said compensator mounting surface by inserting said mechanical fastener through said hole and into said receptacle.

14. The actuator apparatus of claim 1 wherein
    (a) said compensator has a closed end proximate to said first mounting surface and an opposed open end;
    (b) said means of attaching to said compensator comprises at least one pin;
    (c) said compensator has at least one slot proximate to said open end, said slot being adapted to receive said pin;
whereby said compensator may be attached to said compensator mounting surface by engaging said pin into said slot.

15. The actuator apparatus of claim 1 wherein
    (a) said compensator has a closed end proximate to said first mounting surface and an opposed open end;
    (b) said compensator comprises a facing surface proximal to said open end and substantially parallel to at least one face on said compensator mounting surface;
    (c) said means of attaching to said compensator comprises at least one weld joining said facing surface with said compensator mounting surface;
whereby said compensator may be attached to said compensator mounting surface by compressing said compensator against said compensator mounting surface and welding said facing surface to said compensator mounting surface.

16. The actuator apparatus of claim 1 wherein
    (a) said compensator and said compensator mounting surface are of materials having different coefficients of thermal expansion;
    (b) said smart material device is compressed between said first mounting surface and said second mounting surface to a predetermined level of preloading,
    (c) said preloaded smart material device has a first coefficient of thermal expansion, and
    (d) said compensator and said compensator mounting surfaces are adapted such that when joined said compensator and said compensator mounting surfaces have a combined coefficient of thermal expansion substantially equal to said first coefficient of expansion.

17. The actuator apparatus of claim 1 wherein said compensator further comprises a preload screw and said first mounting surface comprises a thrust plate wherein said preload screw is adapted to engage said thrust plate such that upon tightening said preload screw the compression of said smart material device is increased and upon loosening said preload screw said compression of said smart material device is decreased.

18. The actuator apparatus of claim 1 further comprising at least one dampener attached to said compensator and movably attached to at least said one actuating arm, said dampener comprising a pliable stop between said actuating arm and said compensator.

19. An energy capture apparatus comprising a smart material device, an enclosed compensator, a movable supporting member, two mechanical webs, and at least one actuating arm wherein
- (a) said mechanical webs comprise a first compliant member attached to a compensator mounting surface further comprising means of attaching to said compensator, and a second compliant member attached to said movable supporting member;
- (b) said movable supporting member comprises a second mounting surface opposed and substantially parallel to said first mounting surface;
- (c) said actuating arm comprises a first actuating arm end attached to one said mechanical web and an opposed second actuating arm end adapted to attach to a source of motion; and
- (d) said smart material device is affixed within said compensator, between said first interior mounting surface and said second mounting surface, and is substantially surrounded by said compensator;

whereby substantially upon movement of said source of motion, said actuating arm causes said compliant members to flex, thereby causing said movable supporting member to move, thereby causing said smart material device to generate electrical energy from said source of motion.

20. A sensor comprising a smart material device, an enclosed compensator, a movable supporting member, at least two mechanical webs, and at least one actuating arm wherein
- (a) said compensator has a first mounting surface,
- (b) said mechanical webs comprise a first compliant member attached to a compensator mounting surface further comprise means of attaching to said compensator and a second compliant member attached to said movable supporting member;
- (c) said movable supporting member comprises a second mounting surface opposed and substantially parallel to said first mounting surface,
- (d) said actuating arm comprises a first actuating arm end attached to one said mechanical web and an opposed second actuating arm end adapted to attach to a source of motion; and
- (e) said smart material device is affixed between said first mounting surface and said second mounting surface and substantially surrounded by said compensator;

whereby substantially upon movement of said source of motion, said first and second compliant members flex, thereby causing said movable supporting member to move, thereby causing said smart material device to generate an electrical signal indicating the degree of said movement of said source of motion.

* * * * *